United States Patent

[11] 3,584,158

[72] Inventors Larry D. Jefferies
Annapolis;
Edward L. Rich, III, Baltimore, both of, Md.
[21] Appl. No. 782,617
[22] Filed Dec. 10, 1968
[45] Patented June 8, 1971
[73] Assignee Westinghouse Electric Corporation
Pittsburgh, Pa.

[54] HELIUM SPEECH UNSCRAMBLER
13 Claims, 6 Drawing Figs.

[52] U.S. Cl. 179/100.2, 179/1
[51] Int. Cl. G11b 5/52
[50] Field of Search 179/100.2 T, 1 SA, 1 UW

[56] References Cited
UNITED STATES PATENTS 3,235,670 2/1966 Kihara 179/100.2
2,006,961 7/1935 Moore 179/100.2
3,485,960 12/1969 Gray 179/100.2
3,409.744 11/1968 Liberman 179/100.2

OTHER REFERENCES

Holywell K. & Harvey G., " Helium Speech" The Journal of the Acoustical Society of America, Vol. 36 No. 1, Jan. 1964, Pages 210— 211.

*Primary Examiner*—J. Russell Goodeau
*Attorneys*—F. H. Henson, E. P. Klipfel and D. Schron

ABSTRACT: An input helium speech signal shifted in frequency from normal, by a multiple $S_H$ is recorded on a loop of magnetic tape traveling at a constant velocity $V_T$. The signal is recorded on the tape by means of a rotating head assembly having a plurality of magnetic recording heads and rotated at a tangential velocity of $H_H$ in a direction opposite to the travel of magnetic tape. The signal is recorded at a speed of $V_H+V_T$. A playback head is positioned for picking up the recorded signal which plays back at a speed of $V_T$. The speeds are chosen such that the ratio of the recording speed to the playback speed is approximately equal to the shift $S_H$. To eliminate gaps or overlaps of recording on the magnetic tape, an arrangement is provided whereby the contact of the tape with the rotating head assembly can be varied.

WITNESSES:
Leon M. Garman
James F. Young

INVENTORS
Larry D. Jefferies and
Edward L. Rich, III
BY Dean Schron
ATTORNEY

HELIUM SPEECH UNSCRAMBLER

BACKGROUND OF THE INVENTION

1. Field of the Invention

The invention in general relates to the field of frequency conversion and more particularly to electromechanical helium speech unscrambling apparatus.

2. Description of the Prior Art

Deep sea divers are, in general, limited to a depth of around 200 feet when breathing an air (nitrogen-oxygen) atmosphere since around and beyond this depth a physiological reaction to the nitrogen occurs to bring on a narcotic effect, known as nitrogen narcosis. To eliminate nitrogen narcosis and thereby extend the divers' depth capabilities, a helium-oxygen mixture is utilized instead of air. The helium however has a much lower molecular weight than nitrogen and creates a problem in communication by seriously distorting the voice to the point of being unintelligible. Basically, the distortion is due to an increase in the frequency or pitch of the spoken word, except for the fundamental. That is to a good approximation, all of the haromonics, known as formants, are increased in frequency by a common multiple which may be as high as 3.0 and determined by such factors as the gas mixture used and the working pressure. The shifted frequency speech results in what is commonly termed the "Donald Duck" effect or helium speech.

Electromechanical devices to "unscramble" the helium speech include the use of a tape recorder which records the speech at a first speed and thereafter plays it back at a slower speed. With this arrangement however real time conversation cannot be accomplished since it may require up to three times as long to play back the message than it did to record the message. Prior electromechanical devices for real time helium speech unscrambling include the use of a tape recorder apparatus with a rotating playback head arrangement to provide the desired downward shift in frequency. The rotating playback head apparatus suffers from an extremely poor signal to noise ratio due to the use of a slipring arrangement connected to the playback head.

In addition, it is extremely important that continuity of recorded signal be maintained without any gaps or overlaps in the recording medium in a system where portions of the input speech are unused.

It is an object of the present invention to provide an electromechanical converter for utilization as a real time helium speech unscrambler which eliminates the deficiencies of prior art apparatus.

A further object of the present invention is to provide an electromechanical helium speech unscrambler wherein continuity of signal on the recording medium is maintained.

SUMMARY OF THE INVENTION

Briefly, apparatus according to the present invention includes a recording medium for storing a signal and means for recording a shifted frequency signal on said recording medium at a first rate. Read means are provided for reading the stored signal at a second rate slower than the first rate during the time the recording takes place. The recording means includes a rotating head assembly having one or more recording units such as magnetic recording heads when the recording medium is magnetic tape. The tape may be in the form of a continuous loop driven at a constant velocity $V_T$ whereas the rotating head assembly is rotated at a tangential velocity $V_H$ whereby recording of an input signal takes place at a speed of $V_H+V_T$ whereas a stationary playback head positioned contiguous the loop of magnetic tape plays back the signal at a slower speed, $V_T$. Means are provided for bringing more or less magnetic tape into contact with the rotating head assembly to prevent gaps or overlaps in the recorded signal on the tape.

DESCRIPTION OF THE PREFERRED EMBODIMENT

Figure 1:
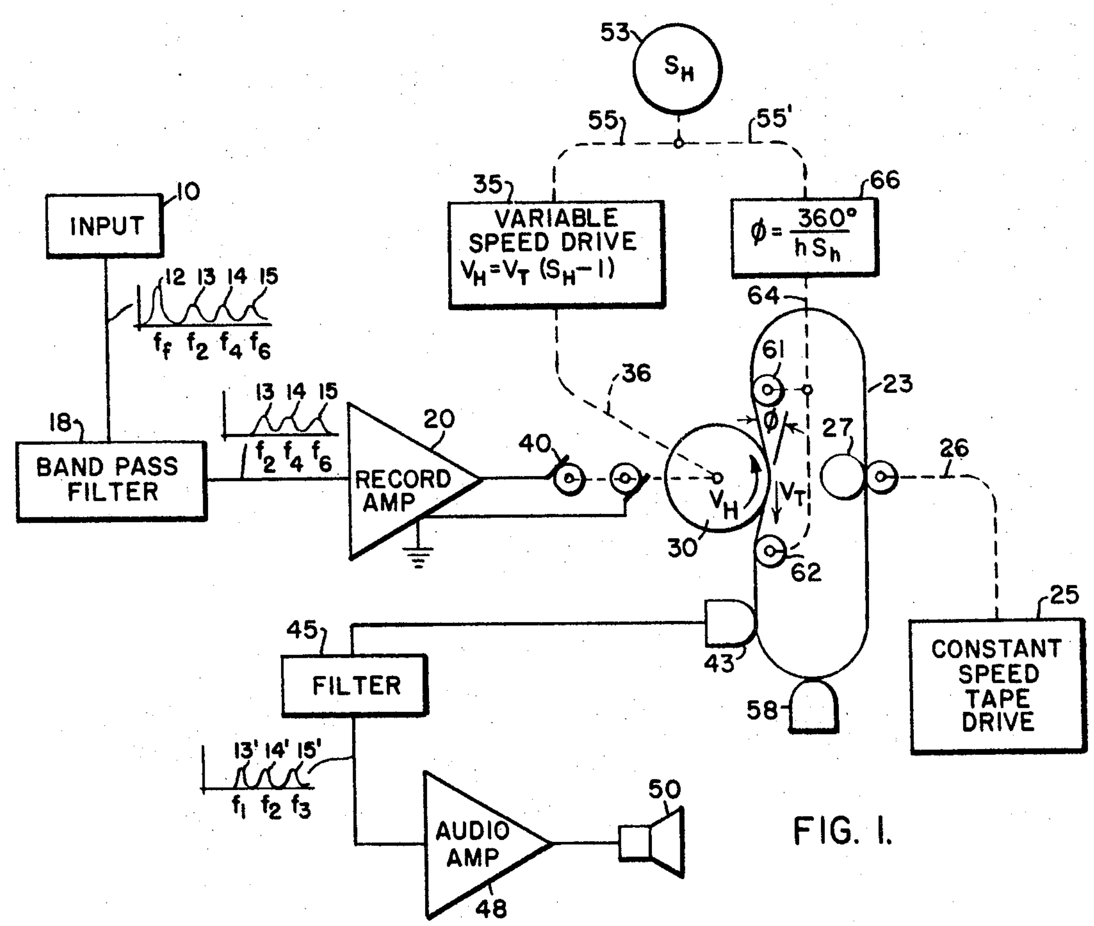
FIG. 1 is a block diagram illustrating a preferred embodiment of the present invention.

The preferred embodiment will be described by way of example with respect to a helium speech input. A diver is provided with a pickup device such as microphone 10, the output of which is a frequency signal illustrated as having a fundamental 12 at a frequency $f_f$ and a plurality of formants 13, 14 and 15 which, due to the helium atmosphere have been shifted from their normal frequencies of $f_1$, $f_2$ and $f_3$, to respective frequencies $f_2$, $f_4$ and $f_6$ representing a shift $S_H$, of 2.

It is not necessary to process the fundamental 12 since it remains unshifted and accordingly there is provided a band pass filter to pass signals in the range of for example 600 hertz to 9 kilohertz and it is seen that its output signal contains only the shifted frequency speech signal, that is formants 13, 14 and 15. Amplifier means 20 is provided for amplifying the output signal from the band pass filter such that the output signal provided by the amplifier 20 is in the range of volts, or tens of volts at a proper level to match the recorded heads 30. The shifted frequency speech signal is recorded on a recording medium capable of storing a signal, one example of which is magnetic tape 23 in the form of a continuous loop. The magnetic tape 23 is driven at a predetermined and preferably constant velocity $V_T$ by a constant speed tape drive 25 through linkage 26 and roller assembly 27, in a well-known manner.

A recording means is provided for recording the shifted frequency speech signal on the magnetic tape 23 at a predetermined recording speed greater than the velocity $V_T$. The recording means is in the form of a rotating head assembly 30 having at least one recording unit and preferably, as illustrated, having a plurality of recording units in the form of magnetic recording heads and rotatable about a central axis by means of a variable speed drive 35 through linkage 36 at a tangential velocity of $V_H$.

Means are provided the transferring the relatively high voltage output signal from the amplifier 20 to the plurality of magnetic recording heads of the rotating head assembly 30. Many means are known to those skilled in the art for transferring a signal to a rotating member and FIG. 1 illustrates one such means in the form of sliprings 40. The use of slip rings often introduces a small noise voltage. Heretofore rotating head assemblies have been utilized as a pickup having magnetic read or playback heads and a small unamplified signal from the playback heads were supplied to the sliprings and then to an output means. In such instance the signal to noise ratio was extremely poor since the amplitude of the signal being read was not much higher than the amplitude of the noise generated by the sliprings. The present invention provides for much higher signal to noise ratio since the noise voltage generated by the sliprings is negligible when compared with the output voltage of the amplifier 20.

A read means in the form of playback head 43 is positioned in signal transfer relationship with the magnetic tape 23 for reading recorded signals therefrom and is displaced from, the stationary with respect to, the axis of rotation of the rotating head assembly 30. The output of the playback head is supplied to a filter 45 operable to filter out high frequency noise. The signal provided by the filter 45 contains formants 13', 14' and 15' which have been shifted back down to their normal frequencies of $f_1$, $f_2$ and $f_3$, respectively and is a translation or unscrambling of the original helium speech input. An audio amplifier 48 forms part of an output utilization means which may additionally include a speaker 50 so that a real time understanding of the helium speech may be provided. Alternatively, the output could include an earphone or a magnetic tape storage or various combinations of these items.

The apparent downward shift in frequency is accomplished by recording the signal at one speed and concurrently playing back the recorded signal at a second and slower speed with the ratio of the recording to playback speed being approximately equal to the shift in frequency $S_H$. That is, $S_H$ equals recording speed divided by the playback speed:

$S_H$=Recording Speed/Playback Speed Since the rotating head assembly 30 is traveling at a velocity $V_H$ in a direction opposite to the tape, which is traveling at a velocity of $V_T$, the recording speed is $V_H+V_T$. Since the playback head 43 is stationary the relative playback speed is $V_T$ therefore $S_H=(V_H+V_T)/V_T$. Knowing the frequency shift $S_H$ and the known constant speed $V_T$ the velocity of the rotating head assembly 30 may be determined and is $V_H=V_T(S_H-1)$.

The variable speed drive 35 is made variable in accordance with the frequency shift $S_H$. There is provided therefore a shift setting means 53 which may be, for example, a variable resistor and camming arrangement operably connected to the variable speed drive 35 by means of coupling 55 to set the rotating head assembly 30 at the proper velocity $V_H$ in accordance with the frequency shift $S_H$.

Various forms of recording medium may be utilized for storing signals and if magnetic tape is utilized it may be placed on reels or as illustrated in FIG. 1 may be a continuous loop of magnetic tape 23. Where a continuous loop of magnetic tape is utilized there is provided an erase head 58 for erasing the signal on the tape after it has been read by the playback head 43.

If the apparatus were utilized in situations where $S_H$ never varied then the velocity $V_H$ could also be fixed and constant. However in situations where $S_H$ may vary, and accordingly where the velocity $V_H$ would vary relative to velocity $V_T$ there may develop gaps or overlaps in the recorded signal due to operation at different speeds. There is accordingly provided means for varying the duration of recording contact of the magnetic recording heads with the magnetic tape 23. This may be accomplished by the provision of camming means 61 and 62 for varying the angle Φ, and accordingly varying the amount of magnetic tape 23 that is in contact with the rotating head assembly 30. The camming means 61 and 62 may be physically positioned by hand or may be positioned by means of linkage 64 controlled by a setting device 66 set by the shift setting means 53 through coupling 55′. As will be demonstrated with respect to FIG. 3, the angle Φ is determined by the number $h$ of magnetic recording heads utilized and the frequency shift $S_H$. The relationship is:

$\Phi=360°/h\ S_H$

Figure 2:
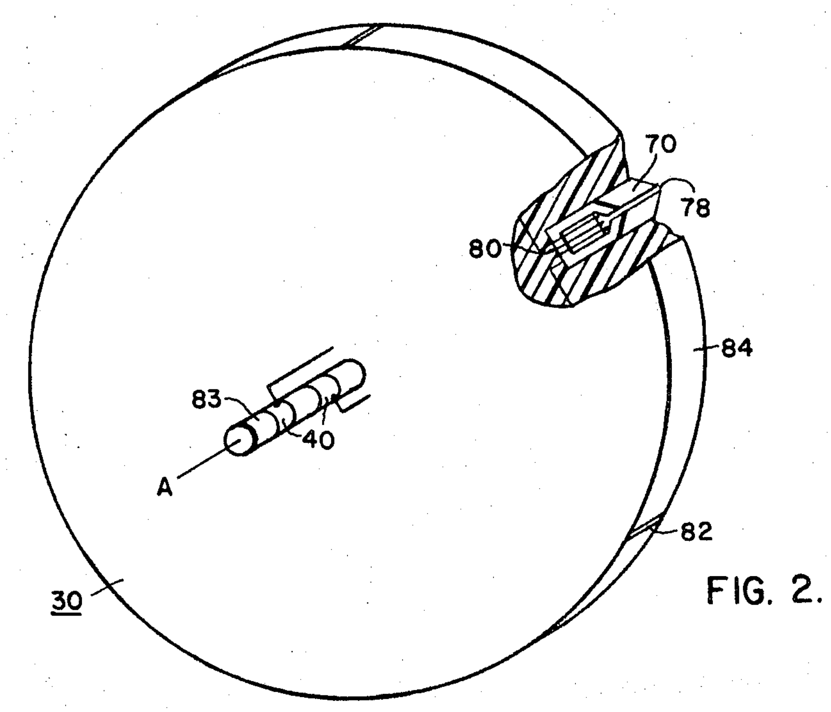
FIG. 2 is an isometric view, with a portion broken away, of the rotating head assembly of FIG. 1.
Figure 3:
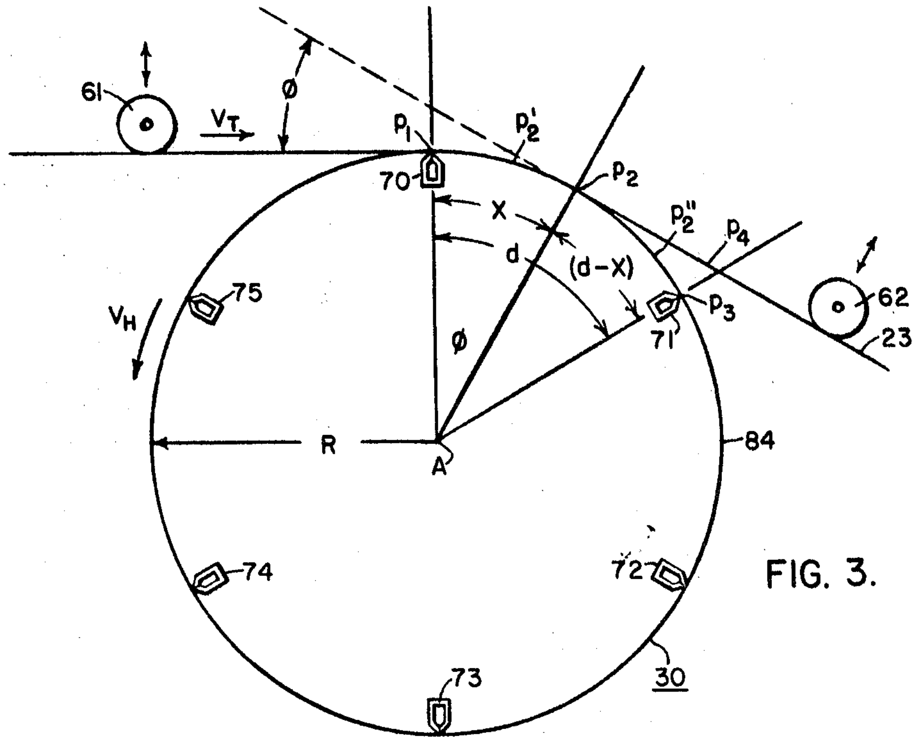
FIG. 3 is a plan view of the rotating head assembly of FIG. 1 illustrating in further detail the arrangement of magnetic recording heads and various angular orientations.

To further illustrate the recording operation and the varying of the angle Φ reference is now made to FIGS. 2 and 3.

A variety of rotating ahead assembly arrangements may be utilized herein and FIG. 2 is an isometric view with a portion broken away illustrating one such arrangement. The rotating head assembly 30 includes a plurality of magnetic recording heads arranged around the periphery thereof. Magnetic recording head 70 is illustrated in the broken away portion, and includes a magnetic recording area or gap 78 with the magnetic recording head 70 being operable to magnetically transfer a signal provided on winding 80. The winding 80 may be serially or parallely connected to a subsequent magnetic recording head whose magnetic recording area 82 can be seen on the surface 76 of the assembly 30. The signal to be recorded is provided to winding 80 and subsequent recording head windings by means of sliprings 40 electrically connected to the recording head windings and arranged about the shaft 83 and concentrically about axis A. The assembly 30 may be formed of an encapsulating or other nonmagnetic compound, containing the magnetic recording heads, such that the surface 76 forms a circular cylindrical surface 84. In general, a plurality of recording heads are arranged to define a cylindrical surface.

FIG. 3 is a plan view of the rotating head assembly, and for ease of understanding the plurality of evenly spaced magnetic recording heads have been illustrated whereas windings, shaft and sliprings have been omitted. In general the rotating head assembly 30 will have $h$ heads and a radius R. FIG. 3 illustrates an assembly having six magnetic recording heads designated 70—75 all jointly rotating about axis A at a velocity $V_H$ in the direction illustrated. The magnetic tape 23 is traveling at a velocity $V_T$ in the direction indicated and which contacts the surface 84 of assembly 30 at point $p_1$, at which point there is positioned magnetic recording head 70. The tape 23 is wrapped along the surface 84 for a short distance to point $p_2$ where it leaves the surface. A subsequent magnetic recording head 71 located at point $p_3$ will be brought into signal transfer relationship with the magnetic tape 23 at point $p_2$. The angle between the tape initially contacting the surface 84 and the tape leaving the surface 84 is herein termed Φ. From geometrical considerations Φ is also the angle defined by the lines $Ap_1$ and $Ap_2$.

Initially, recording head 70 comes into recording contact with the tape 23 and point $p_2$ to begin recording a signal, and continues to record a signal until it leaves recording contact at point $p_1$. Since the tape 23 is traveling at a velocity $V_T$ the beginning of the signal recorded at point $p_2$ has now traveled to point $p_4$ and the recording head 70 has recorded a segment extending from point $p_4$ to $p_1$ illustrated in FIG. 4A and designated segment 70 extending from $p_4$ to $p_1$.

When the recording head 70 leaves recording contact with the tape 23 there are no recording heads in contact with the tape and consequently the diver's speech is not recorded for a short time period until recording head 71 comes into recording contact with the magnetic tape w3 at point $p_2$ whereupon the previous progress is repeated. The angle Φ is chosen such that the end of the signal recorded by recording head 70 reaches point $p_2$ at the exact same time as recording head 71 to preserve continuity of signal as illustrated in FIG. 4A where the portion of tape and signal recorded by recording head 71 is designated as segment 71. In general, subsequent recording heads arrive at point $p_2$ at the exact same time that a previous recorded segment leaves point $p_2$ and, as seen in FIG. 4A, there are no gaps ro over laps of the recorded signal on the magnetic tape 23.

With the arrangement of FIG. 3, suppose now that due to an increase in $S_H$ it is required to increase the recording speed relative to the playback speed. This is accomplished by increasing $V_H$, the rotating head assembly velocity. With this increase in velocity recording head 71 will come into recording contact with the tape 23 at point $p_2$ in a faster period of time than the previous example and the end of the segment recorded by recording head 70 will not arrive concurrently but will be at some point $p'_2$. The situation occurs therefore wherein recording head 71 is recording over a portion ($p_2$ to $p'_2$) of the previous segment and there is an overlap of signal. This situation is applicable to subsequent recording heads such that the magnetic tape as depicted in FIG. 4B results. It is seen that the segments overlap one another, an objectionable occurrence since the output signal will be degraded, if not unintelligible.

Figure 4C:
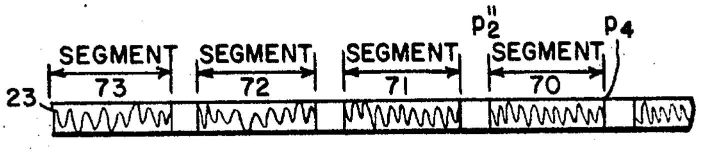
FIGS. 4A to 4C are sections of magnetic recording tape illustrating signal continuity provided by a feature of the present invention.
Figure 4A:
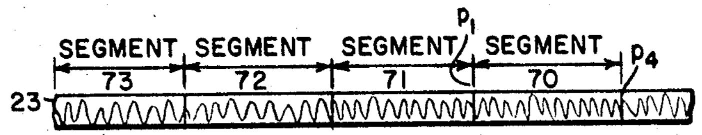
Figure 4B:
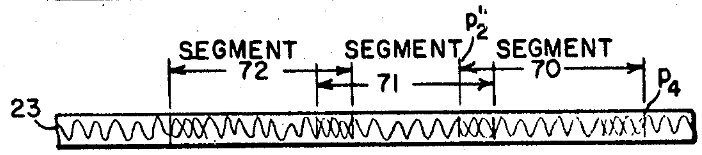

If the velocity $V_H$ must be decreased to accommodate for a smaller $S_H$, then gaps will occur between recorded segments, as depicted in FIG. 4C due to the fact that the end of the segment recorded by recording head 70 (and subsequent recording heads) will leave point $p_2$ prior to recording head 71 (and subsequent recording heads) arriving at that point. In order to eliminate the overlaps and gaps in the recorded signal, means have been provided for varying the angle Φ which in effect, varies the position of point $p_2$ between points $p_1$ and $p_3$ for varying the duration of the recording contact of the recording heads. The means for varying the angle Φ have been shown as camming means 61 and 62, although it is obvious that a single camming means or any other means may be provided to accomplish this function. With increased head velocity $V_H$, to eliminate overlaps of recorded segments, the angle $\Phi$ is decreased, and in the example chosen would be decreased to a point where magnetic tape 23 would leave the surface 84 of the assembly 30 at point $p'_2$. Where $V_H$ is decreased $\Phi$ would be increased and in the example $\Phi$ would be increased to a point where the magnetic tape 23 would leave the surface 84 of assembly 30 at point $p''_2$.

In general, the time it takes for the end of a recorded segment at point $p_1$ to reach point $p_2$ must be equal to the time it takes a recording head at point $p_3$ to reach point $p_2$. If $x$ is the distance along the surface 84 between points $p_1$ and $p_2$ and $V_T$ is the velocity of magnetic tape 23, the time required for the end of the recorded segment to travel from $p_1$ to $p_2$ is $$t=x/V_T \qquad (1)$$

If $d$ is the distance along surface 84 between points $p_1$ and $p_3$ then the time it takes for a recording head position $p_3$ to reach point $p_2$ is $$t=(d-x)/V_H \qquad (2)$$

Since the times are to be equal:

$$x/V_T=(d-x)/V_H \qquad (3)$$

The distance $x$ may therefore be determined:

$$x=D\ V_T/V_H+V_T \qquad (4)$$

The quantity $v_T/V_H+V_T$ is the ratio of the playback speed to the record speed and is equal to $1/S_H$. Equation (4) therefore reduces to $$x=d/S_H \qquad (5)$$

$\Phi$ is the angle subtended by an arc of length $x$ on the circumference of a circle of radius $R$ and accordingly $$x=\Phi R \qquad (6)$$

and $$\Phi=d/R\ S_H \qquad (7)$$

The $\Phi$ in equation (7) is in radians and the $d$ is dependent upon the number of recording heads. Converting to degrees and with $h$ recording heads, equation (8) expresses the setting of the angle $\Phi$ in degrees as a function of the frequency shift $S_H$:

$$\Phi=360/h\ S_H \qquad (8)$$

It has been mentioned previously that there are time periods wherein the speaker's voice is not recorded. This is necessitated by the fact that for real time operation the message must be played back at a slower speed than recorded yet it must be done in the same time interval that it took to record it. If the duration of unrecorded speech is kept very small then an intelligible output speech signal may still be provided. By way of example, the apparatus described herein may be fabricated and operated such that for a frequency shift $S_H$ of for example 2 there will be an alternate sequential 10-millisecond recording period each followed by a 10-millisecond nonrecording period.

Although the present invention has been described with a certain degree of particularlity, it should be understood that the present disclosure has been made by way of example and that modifications and variations of the present invention are made possible in the light of the above teaching.

We claim:

1. Frequency converter apparatus comprising:
a. input means for receiving a speech signal shifted in frequency from normal by a factor $S_H$;
b. a recording medium capable of storing a signal;
c. movable recording means having at least one individual recording unit;
d. drive means for moving said recording means at a velocity $V_H$ for bringing said individual recording unit into sequential signal transfer relationship with said recording medium;
e. means for supplying said speech signal to said recording unit;
f. drive means for driving said recording medium at a velocity $V_T$ in a direction opposite to the direction of movement of said recording unit when in signal transfer relationship with said recording medium; and
g. read means positioned in signal transfer relationship with said recording medium for reading stored signals therefrom.

2. Apparatus according to claim 1 wherein:
a. the recording medium is a magnetic recording medium; and
b. the movable recording means is a head assembly rotatable about an axis and having individual recording units in the form of magnetic recording heads.

3. Apparatus according to claim 2 wherein:
a. the recording heads jointly rotate about the axis and define a cylindrical surface.

4. Apparatus according to claim 2 wherein:
a. the magnetic recording medium is a magnetic tape.

5. Apparatus according to claim 4 wherein:
a. the magnetic tape is a continuous loop and which additionally includes;
b. erase means positioned contiguous said loop for erasing a stored signal subsequent to said signal being read.

6. Apparatus according to claim 1 wherein:
a. the movable recording means is rotatable about a stationary axis; and
b. the read means is displaced from, and stationary with respect to, said axis.

7. Apparatus according to claim 1 wherein:
a. $V_T$ is substantially constant; and
b. $V_H$ is variable in accordance with $S_H$.

8. Apparatus according to claim 1 which includes:
a. means for varying the duration of signal transfer relationship of the recording unit with the recording medium.

9. Apparatus according to claim 1 wherein:
a. the movable recording means is a head assembly rotatable about an axis and having a periphery and individual recording units positioned at points spaced around the periphery of said assembly; and wherein
b. the recording medium contacts said periphery between first and second points; and which additionally includes
c. means for varying the spacing between said first and second points.

10. Apparatus according to claim 9 wherein:
a. the recording medium is magnetic tape;
b. the head assembly defines a cylindrical surface;
c. the recording units are magnetic recording heads spaced evenly about said cylindrical surface;
d. the magnetic tape initially touches said cylindrical surface at the first point and contacts said cylindrical surface until said second point;
e. the distance along said cylindrical surface between the first and second points being less than the distance along the cylindrical surface between adjacent magnetic recording heads.

11. Speech unscrambler apparatus comprising:
a. an input for receiving a speech signal including a plurality of formants substantially shifted in frequency from normal by a factor $S_H$, and an unshifted fundamental;
b. filter means for removing said fundamental to pass only said formants as a formant signal;
c. a first amplifier operatively connected to said filter means for amplifying said formant signal;
d. a magnetic recording medium;
e. a rotatable head assembly including a plurality of magnetic recording heads;
f. drive means for rotating said head assembly for bringing said magnetic recording heads into sequential recording contact with said recording medium;
g. transfer means for transferring the amplified formant signal to said magnetic recording heads;
h. drive means for driving said recording medium relatively past said head assembly in a direction opposite to the direction of movement of said head assembly when in signal transfer relationship with said recording medium;
i. a magnetic read head positioned contiguous said recording medium for picking up recorded formant signals thereon;

j. a second amplifier operatively connected to said magnetic read head to amplify the signal provided thereby; and k. output utilization means operatively connected to said second amplifier.

12. Apparatus according to claim 11 wherein:

a. the transfer means includes at least one slipring positioned coaxially about the axis of rotation of the head assembly.

13. Apparatus according to claim 11 which additionally includes:

a. filter means connected in circuit between the magnetic read head and the second amplifier for filtering out high frequency noise.